United States Patent
Chen et al.

(10) Patent No.: US 8,404,056 B1
(45) Date of Patent: Mar. 26, 2013

(54) PROCESS CONTROL FOR A SONICATION CLEANING TANK

(75) Inventors: Chaoyuan Chen, San Jose, CA (US); Bing-Shiuan Chang, San Jose, CA (US); Rhownica A. Lund, Fremont, CA (US); Atul K. Trivedi, Milpitas, CA (US); John Cho, Pleasanton, CA (US); Shaun H. Chen, Cupertino, CA (US)

(73) Assignee: WD Media, LLC, San Jose, CA (US)

( * ) Notice: Subject to any disclaimer, the term of this patent is extended or adjusted under 35 U.S.C. 154(b) by 797 days.

(21) Appl. No.: 12/473,223

(22) Filed: May 27, 2009

(51) Int. Cl.
*B08B 3/00* (2006.01)

(52) U.S. Cl. ........ 134/56 R; 134/111; 134/113; 134/902

(58) Field of Classification Search ................ 134/56 R, 134/111, 113, 902
See application file for complete search history.

(56) References Cited

U.S. PATENT DOCUMENTS

| | | | |
|---|---|---|---|
| 3,276,458 A * | 10/1966 | Davis et al. ................ | 134/57 R |
| 4,181,009 A | 1/1980 | Williamson | |
| 4,711,256 A * | 12/1987 | Kaiser .......................... | 134/25.4 |
| 4,779,451 A * | 10/1988 | Ezawa et al. ................. | 73/53.01 |
| 4,865,060 A | 9/1989 | Shibano | |
| 4,907,611 A | 3/1990 | Shibano | |
| 5,089,144 A | 2/1992 | Ozkahyaoglu et al. | |
| 5,286,657 A | 2/1994 | Bran | |
| 5,301,701 A | 4/1994 | Nafziger | |
| 5,482,068 A | 1/1996 | Kitahara et al. | |
| 5,647,386 A * | 7/1997 | Kaiser .......................... | 134/113 |
| 5,849,104 A | 12/1998 | Mohindra et al. | |
| 5,868,855 A * | 2/1999 | Fukazawa et al. ............. | 134/1.3 |
| 5,873,947 A | 2/1999 | Mohindra et al. | |
| 5,931,173 A * | 8/1999 | Schiele ........................ | 134/57 R |
| 5,988,189 A | 11/1999 | Mohindra et al. | |
| 6,106,590 A | 8/2000 | Ueno et al. | |
| 6,167,891 B1 | 1/2001 | Kudelka et al. | |
| 6,172,376 B1 | 1/2001 | Xu et al. | |
| 6,357,458 B2 * | 3/2002 | Tanaka et al. ................ | 134/57 R |
| 6,402,818 B1 | 6/2002 | Sengupta | |
| 7,004,016 B1 * | 2/2006 | Puskas ......................... | 73/64.53 |
| 7,311,847 B2 * | 12/2007 | Kashkoush ................... | 210/739 |
| 7,976,718 B2 | 7/2011 | Kashkoush et al. | |
| 2002/0142617 A1 | 10/2002 | Stanton | |
| 2003/0159713 A1 | 8/2003 | Park et al. | |
| 2004/0016442 A1 | 1/2004 | Cawlfield | |
| 2004/0035449 A1 | 2/2004 | Nam | |

(Continued)

FOREIGN PATENT DOCUMENTS

| | | | |
|---|---|---|---|
| JP | 02-157077 | * | 6/1990 |
| JP | 2001-009395 | * | 1/2001 |

(Continued)

OTHER PUBLICATIONS

U.S. Appl. No. 12/473,227, filed May 27, 2009, 37 pages.

(Continued)

*Primary Examiner* — Michael Barr
*Assistant Examiner* — Jason Riggleman

(57) ABSTRACT

A disk is placed into a sonication cleaning tank containing a liquid. A first flow rate and a first sonication power are applied to the liquid to clean the disk. An opacity count is generated indicative of contaminants and/or bubbles in the liquid. Based at least in part on the opacity count, a second flow rate and a second sonication power are then applied to the liquid.

22 Claims, 12 Drawing Sheets

U.S. PATENT DOCUMENTS

| | | | |
|---|---|---|---|
| 2004/0238005 A1* | 12/2004 | Takayama | 134/18 |
| 2007/0028437 A1* | 2/2007 | Kimura et al. | 29/284 |
| 2007/0267040 A1 | 11/2007 | Watanabe et al. | |
| 2007/0289394 A1 | 12/2007 | Yao et al. | |
| 2009/0088909 A1* | 4/2009 | Yokoi | 700/300 |

FOREIGN PATENT DOCUMENTS

| | | | |
|---|---|---|---|
| JP | 2007225335 A | | 9/2007 |
| JP | 2007326088 | * | 12/2007 |
| KR | 2007079695 | * | 8/2007 |

OTHER PUBLICATIONS

Office Action dated Apr. 10, 2012 from U.S. Appl. No. 12/473,227, 7 pages.

Notice of Allowance dated Sep. 6, 2012 from U.S. Appl. No. 12/473,227, 5 pages.

* cited by examiner

PROCESS CONTROL FOR A SONICATION CLEANING TANK

BACKGROUND

During magnetic disk manufacturing, disk surfaces are exposed to various sources of contamination. For example, different gases, chemicals, deposition materials and dust may end up as contaminants. These contaminants may be deposited on the disk surfaces in particulate or other forms and must then be removed during one or more stages of the manufacturing process.

Contaminants are typically removed using a combination of sonication and rinsing techniques. A disk may first be submerged in a sonication cleaning tank to loosen and remove contaminants, and then moved to a rinsing tank where the remaining contaminants may be carried away from the disk surfaces. Conventionally, there is no real-time mechanism for measuring the efficiency of these cleaning processes. Thus, there may be relatively little feedback for an operator to determine that the disks are not being cleaned effectively or to detect failure in one or more components of the cleaning apparatuses.

DETAILED DESCRIPTION

Figure 1:
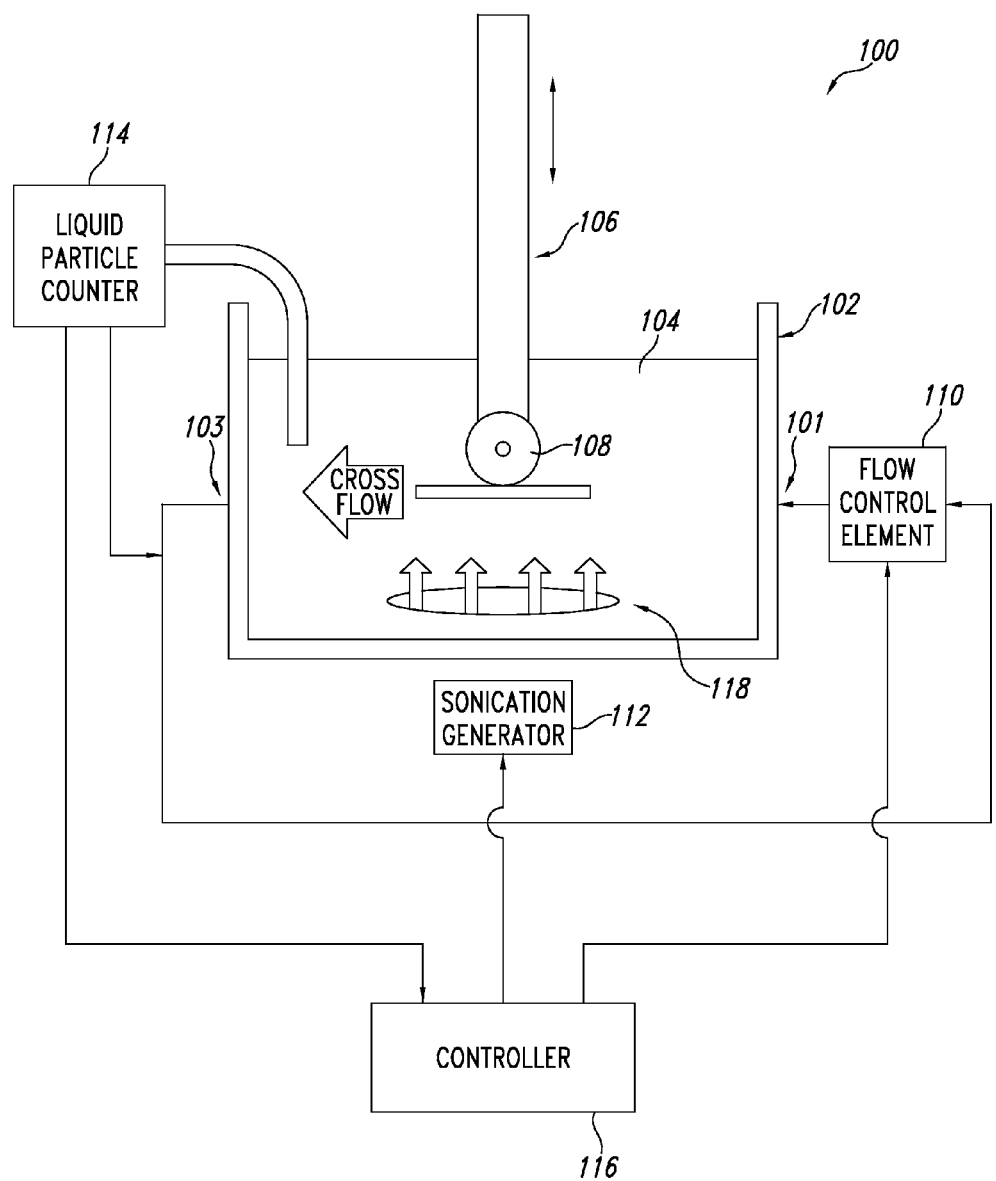
FIG. 1 is a schematic view illustrating an example sonication cleaning system with a disk positioned within the liquid, according to one embodiment.

Referring to FIG. 1, an example sonication cleaning system 100 is illustrated, according to one embodiment. The sonication cleaning system 100 includes a sonication cleaning tank 102 configured to contain a liquid 104, a disk holder 106 configured to hold a disk 108 within the liquid 104 during a cleaning operation, a flow control element 110 coupled to the sonication cleaning tank 102 and configured to cause the liquid 104 to flow through the sonication cleaning tank 102, and a sonication generator 112 configured to generate sonication through the liquid 104 within the sonication cleaning tank 102. The sonication cleaning system 100 further includes a liquid particle counter 114 configured to generate an opacity count indicative of contaminants and/or bubbles in the liquid 104, and a controller 116 communicatively coupled to the liquid particle counter 114 and configured to control at least one of the flow control element 110 and the sonication generator 112 based at least in part on the opacity count.

The sonication cleaning system 100 may be used in a variety of manufacturing and/or cleaning environments. In one embodiment, the sonication cleaning system 100 may be used to clean magnetic disks, and the methods described herein will be described in terms of such workpieces. For example, the sonication cleaning system 100 may be used to perform a post-sputter cleaning of magnetic disks. As another example, the sonication cleaning system 100 may be used to clean magnetic disks at other stages in the manufacturing process. In other embodiments, the methods and systems described herein may be used to clean other workpieces (e.g., industrial equipment, lenses, or other electronic equipment).

The sonication cleaning tank 102 may comprise any of a variety of cleaning tanks employing sonication. In one embodiment, the sonication cleaning tank 102 may comprise a cross flow cleaning tank, as illustrated in FIG. 1. In such an embodiment, the overall flow of the liquid 104 through the sonication cleaning tank 102 is generally perpendicular to the direction of propagation of the acoustic waves generated within the sonication cleaning tank 102. In another embodiment, the sonication cleaning tank 102 may comprise an overflow cleaning tank (illustrated and discussed in greater detail with reference to FIG. 2). In such an embodiment, the overall flow of the liquid 104 through the sonication cleaning tank 102 may be generally parallel to the direction of propagation of the acoustic waves. In other embodiments, other configurations for the sonication cleaning tank 102 may be used.

The sonication cleaning tank 102 may include one or more ingress ports 101 and egress ports 103, which serve to direct the liquid 104 into and out from the sonication cleaning tank 102. The sonication cleaning tank 102 may further include at least one opening at the top through which the disk holder 106 may be lowered into the liquid 104. In one embodiment, as illustrated, the sonication cleaning tank 102 may not include a top wall. The sonication cleaning tank 102 may also have any suitable shape (e.g., rectilinear or bowl-shaped).

In one embodiment, the liquid 104 flowing through the sonication cleaning tank 102 principally comprises deionized water. However, in other embodiments, the liquid 104 may comprise any of a variety of solvents and solutes. For example, the liquid 104 may comprise alcohols, detergents and/or wetting agents. In some embodiments, the liquid 104 may include some undissolved solids. The type of solution may, of course, depend upon the type of workpiece being cleaned as well as upon the cleaning operation performed using the sonication cleaning system 100.

In one embodiment, the sonication cleaning system 100 includes a disk holder 106. As illustrated, the disk holder 106 may be movable between a raised position, wherein the disk 108 is positioned above the liquid 104, and a lowered position, wherein the disk 108 is positioned within the liquid 104.

For example, an actuator (not shown) may be coupled to the disk holder 106, and the actuator may be electronically controlled in order to move the disk holder 106 between these positions. In other embodiments, the disk holder 106 need not be movable. In still other embodiments, the sonication cleaning system 100 need not include a disk holder 106, but may include another structure for holding a workpiece within the liquid 104 during a cleaning operation.

The disk 108 may comprise any of a variety of magnetic or optical disks having a substantially concentric opening defined therethrough. As used herein, the term "disk" refers to a magnetic or optical disk at any stage of manufacturing. That is, the disk 108 need not be readable or writable at the time a cleaning operation is performed using the sonication cleaning system 100. In one embodiment, the sonication cleaning system 100 may be configured to hold and clean a single disk 108. However, in other embodiments, the sonication cleaning tank 102 may accommodate a plurality of disks 108 (not shown).

The flow control element 110 may be fluidly coupled to the sonication cleaning tank 102 via one or more ingress ports 101 and may be configured to cause the liquid 104 to flow through the sonication cleaning tank 102. The flow control element 110 may comprise a number of hydraulic components. In one embodiment, the flow control element 110 may comprise an electronically controlled proportional valve configured to control a flow rate of the liquid 104 between 0 and 100 liters per minute. The proportional valve may be coupled to a pump (not shown), which may ultimately drive the liquid 104 through the sonication cleaning system 100. In other embodiments, other flow control elements, such as servo valves, may be used in order to modulate the flow rate through the sonication cleaning tank 102.

In one embodiment, the sonication cleaning tank 102 may further include a perforated side panel (not shown) near the ingress port(s) 101. The perforated side panel may be configured to create a generally laminar cross flow across the sonication cleaning tank 102 (from right to left in FIG. 1). In other embodiments, multiple ingress ports 101 may be used in order to create a generally laminar cross flow.

The sonication cleaning system 100 may further include a sonication generator 112 configured to generate sonication (i.e., acoustic waves) through the liquid 104 within the sonication cleaning tank 102. The sonication generator 112 may generate megasonication, ultrasonication (a lower frequency sonication than megasonication), or acoustic waves at other frequencies. Ultrasonic cleaning may use lower frequencies and thereby produce more random cavitations, while megasonication may use higher frequencies and thereby produce more controlled cavitations.

In one embodiment, the sonication generator 112 may comprise a frequency generator configured to drive one or more sonication transducers (not shown in FIG. 1). The sonication transducers may, in turn, generate the acoustic stream 118 emanating from the bottom of the sonication cleaning tank 102. The sonication generator 112 may also be electronically controlled, such that the frequency and/or amplitude of the generated sonication may be varied. For example, the sonication generator 112 may comprise a programmable digital generator having a range of 0 to 800 watts. Although illustrated at the bottom of the sonication cleaning tank 102, the sonication generator 112 and associated transducers may be oriented differently in order to generate acoustic waves traveling in other directions.

In one embodiment, the liquid particle counter 114 is fluidly coupled to the sonication cleaning tank 102 and is configured to generate an opacity count indicative of contaminants and/or bubbles in the liquid 104. The liquid particle counter 114 may include a light sensor configured to generate signals indicative of the opacity count. For example, at least some liquid may be drawn from the sonication cleaning tank 102 into the liquid particle counter 114, and the light sensor may comprise a charge-coupled device (CCD) array configured to detect contaminants and bubbles that block or scatter light passing through the drawn liquid. Many liquid particle counters are unable to differentiate between contaminants and bubbles, and thus the opacity count generated by the liquid particle counter 114 may be indicative of both contaminants and bubbles.

In one embodiment, the liquid particle counter 114 may further include a degasser (not shown in FIG. 1) to remove at least some of the bubbles before generating an opacity count. In such an embodiment, depending upon the degassing efficiency, the opacity count may be generally indicative of just contaminants in the liquid 104.

The contaminants may include particulates, oils, and other impurities in the liquid 104. In some embodiments, the liquid particle counter 114 may be configured to detect contaminants and bubbles above a certain size. For example, in one embodiment, the liquid particle counter 114 may be configured to detect contaminants larger than 1.0 µm. In another embodiment, the liquid particle counter 114 may be configured to detect contaminants larger than 0.5, 0.2 or 0.1 µm.

As illustrated, the liquid particle counter 114 may be fluidly coupled near an egress port 103 of the sonication cleaning tank 102. Thus, in one embodiment, the liquid particle counter 114 may draw liquid 104 from the sonication cleaning tank 102 that has already flowed past the disk 108. Of course, in other embodiments, the liquid particle counter 114 may be coupled to the sonication cleaning tank 102 at other locations. For example, the liquid particle counter 114 may comprise a reflectance based detector that may be positioned along an outside wall of the sonication cleaning tank 102. As another example, the liquid particle counter 114 may be positioned within the sonication cleaning tank 102. The liquid particle counter 114 may also be configured to generate the opacity count during a cleaning operation. Thus, in one embodiment, a cleaning operation need not be halted in order to receive feedback regarding the number of contaminants and/or bubbles contained in the liquid 104.

The controller 116 is communicatively coupled to the liquid particle counter 114 and is configured to control at least one of the flow control element 110 and the sonication generator 112 based at least in part on the opacity count. In one embodiment, as illustrated, the controller 116 is coupled to both the flow control element 110 and the sonication generator 112 and may be configured to control both devices. However, in other embodiments, the controller 116 may be coupled to only one of these devices.

The controller 116 may comprise a number of different electronic components. As described in greater detail with reference to FIG. 4, the controller 116 may include a computing device communicatively coupled to the liquid particle counter 114 as well as a programmable logic controller (PLC) communicatively coupled to and controlled by the computing device and further coupled to the flow control element 110 and the sonication generator 112.

During operation, the liquid particle counter 114 may be configured to generate relatively frequent opacity counts indicative of the contaminants and/or bubbles in the liquid 104. The controller 116 may then analyze these opacity counts and use them in a feedback control loop to adjust outputs of either or both of the flow control element 110 and the sonication generator 112. As described in greater detail below, this may enable improved automated control over the sonication cleaning process.

Figure 2:
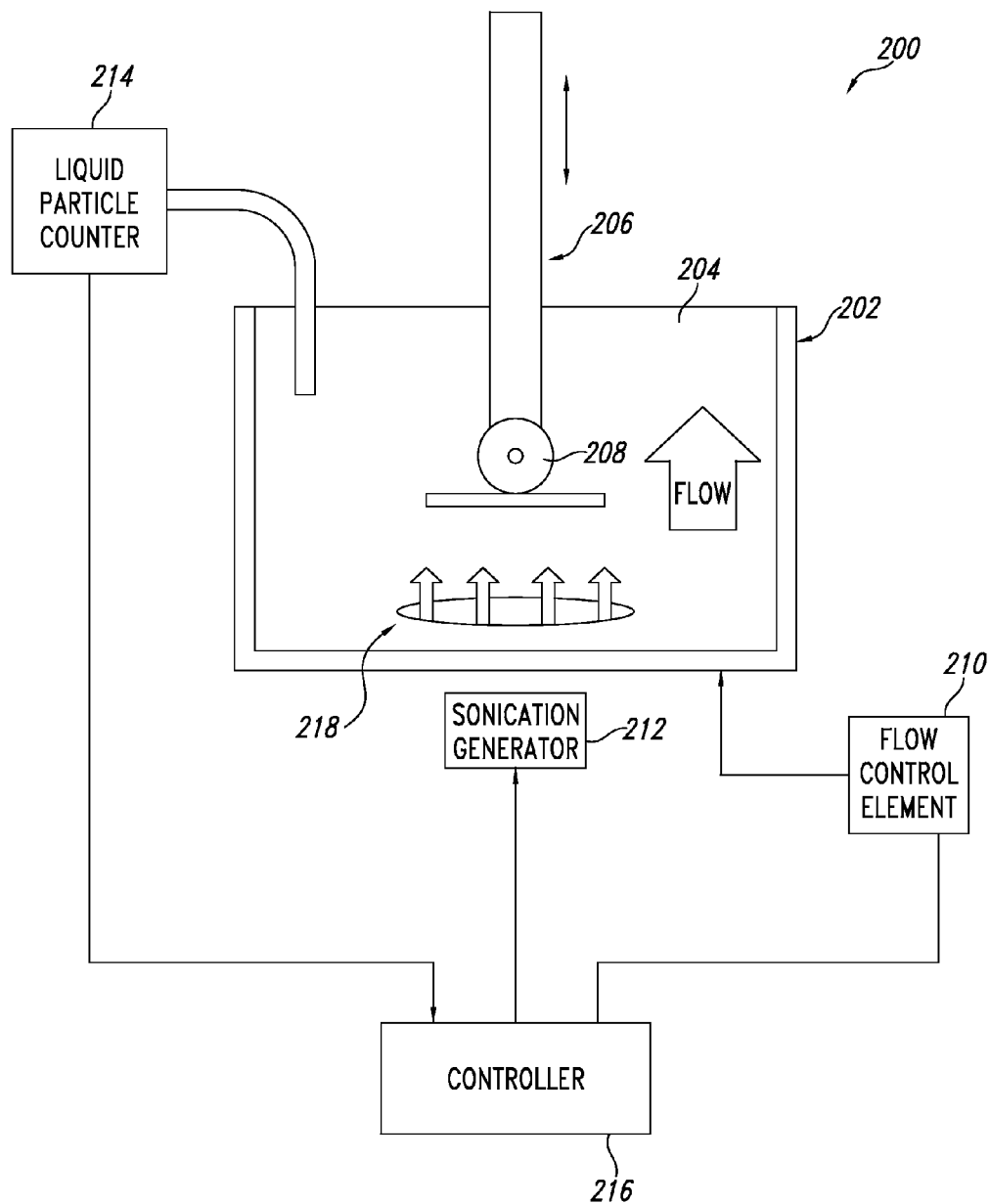
FIG. 2 is a schematic view illustrating another example sonication cleaning system including an overflow sonication cleaning tank, according to one embodiment.

FIG. 2 illustrates a similar sonication cleaning system 200, with like numerals referring to like components. Much of the description corresponding to FIG. 1 can be applied equally to the components of FIG. 2. However, rather than employing a cross flow cleaning tank, FIG. 2 illustrates an overflow sonication cleaning tank 202. As illustrated, the flow control element 210 of FIG. 2 may be fluidly coupled to one or more ingress ports along the bottom of the sonication cleaning tank 202, and the liquid 204 generally flows up and out through the top of the sonication cleaning tank 202.

In one embodiment, as illustrated, the overall flow of the liquid 204 through the sonication cleaning tank 202 may be generally parallel to the direction of propagation of the acoustic waves generated by the sonication generator 212. However, in other embodiments, the sonication generator 212 may be otherwise oriented, such that the overall flow of the liquid 204 through the sonication cleaning tank 202 is generally perpendicular (or at some other angle) to the direction of propagation of the acoustic waves.

Figure 3:
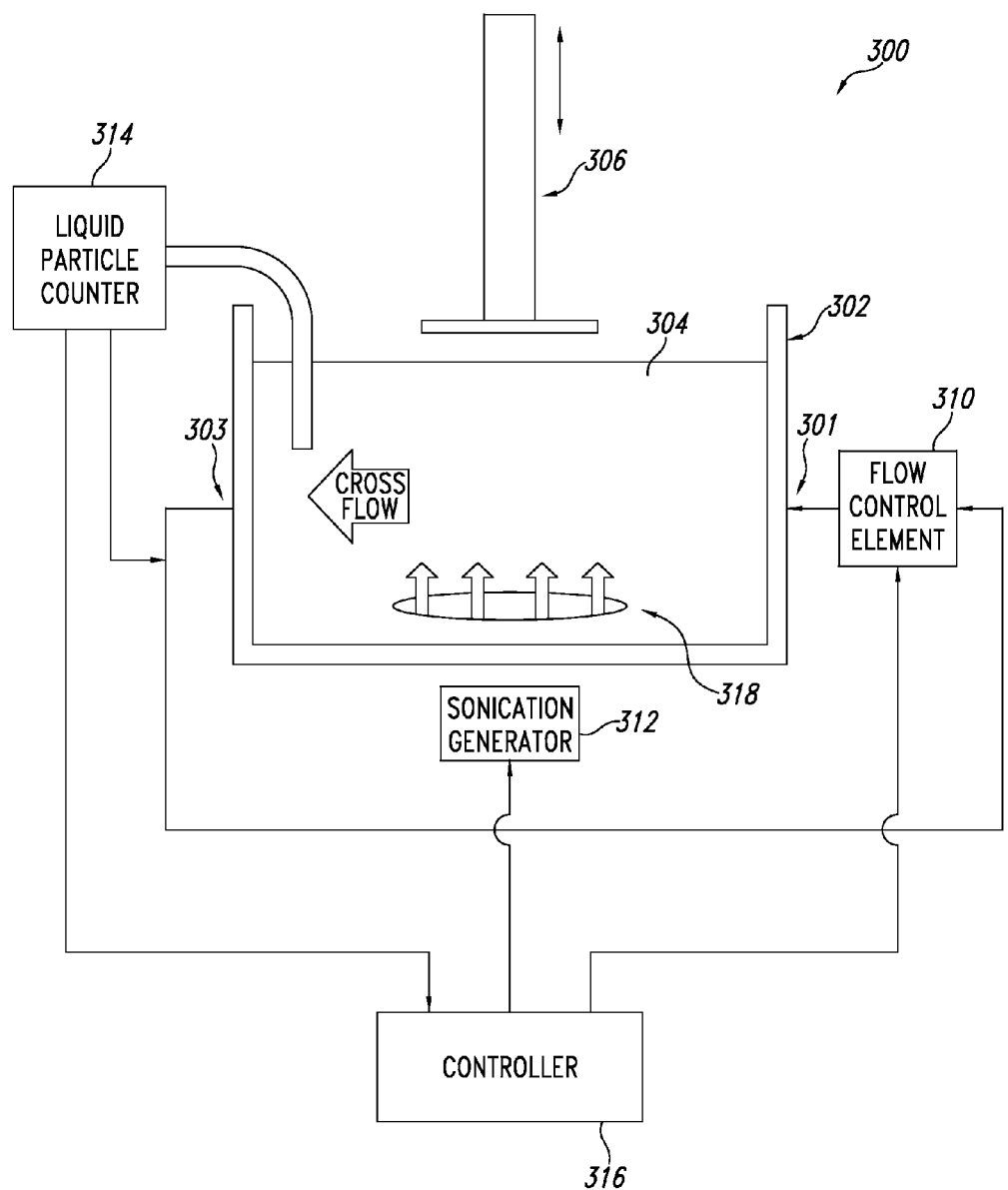
FIG. 3 is a schematic view illustrating an example sonication cleaning system with no disk positioned within the liquid, according to one embodiment.

FIG. 3 illustrates another sonication cleaning system 300 configured similarly to the sonication cleaning system 100, with like numerals referring to like components. Much of the description corresponding to FIG. 1 can be applied equally to the components of FIG. 3. As illustrated, the disk holder 306 of the sonication cleaning system 300 is positioned above the liquid 304 and is not holding a disk.

Indeed, the sonication cleaning system 300 need not even include the disk holder 306. In the illustrated configuration, the sonication cleaning tank 302 may undergo a characterization process, discussed in greater detail below with reference to FIG. 6. In another embodiment, the disk holder 306 is positioned within the liquid 304 during the characterization process. In still another embodiment, the sonication cleaning system 100 as illustrated in FIG. 1 may be used in a characterization process.

Figure 4:
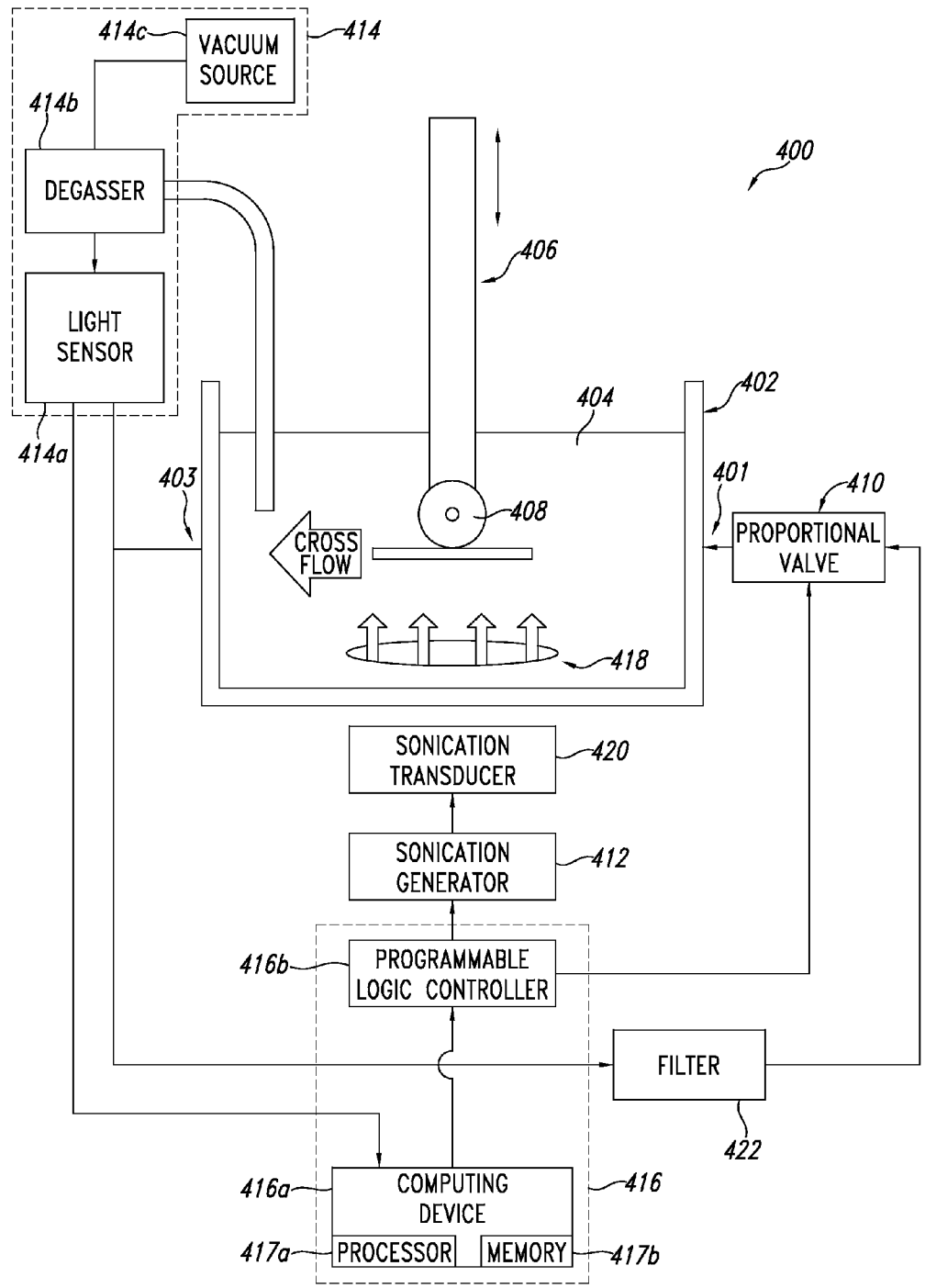
FIG. 4 is a schematic view illustrating an example sonication cleaning system in greater detail, according to one embodiment.

FIG. 4 illustrates yet another sonication cleaning system 400, with some of the components illustrated in greater detail. The sonication cleaning system 400 may be configured similarly to the sonication cleaning system 100 with like numerals referring to like components. Only the new components of FIG. 4 are discussed in greater detail below.

As illustrated, the liquid particle counter 414 may comprise, inter alia, a light sensor 414a configured to generate signals indicative of an opacity count, a degasser 414b configured to remove at least some of the bubbles from the liquid 404 before it reaches the light sensor 414a, and a vacuum source 414c configured to generate at least a partial vacuum within the degasser 414b. The degasser 414b may comprise any of a variety degassing structures. In one embodiment, the degasser 414b comprises a plurality of small tubes with microscopic pores. A partial vacuum is generated within the tubes while the liquid 404 flows around the tubes, and thus gases can pass out of the liquid 404 through the pores into the tubes. Any of a variety of vacuum sources may be used. In one embodiment, a venturi vacuum is used in order to minimize mechanical vibrations that may be generated by other vacuum sources.

As illustrated, the sonication generator 412 may be coupled to one or more sonication transducers 420. The sonication transducer 420 may be driven by the sonication generator 412 in order to generate the acoustic stream 418 emanating from the bottom of the sonication cleaning tank 402. As described above, any of a variety of sonication equipment may be used.

The sonication cleaning system 400 may further include a filter 422 positioned between the egress ports 403 and ingress ports 401 of the sonication cleaning tank 402. This filter 422 may be designed to filter a number of different contaminants, and, in some embodiments, different filters may be combined in series or in parallel. A variety of different filters may be used.

In one embodiment, the controller 416 includes a computing device 416a, the computing device 416a including a processor 417a operable to execute instructions and a computer-readable memory 417b having instructions stored thereon that are executable by the processor 417a in order to cause the processor 417a to perform certain functions. In different embodiments, the computing device 416a may perform different functions, as described in greater detail below. The controller 416 may further include a programmable logic controller 416b. As illustrated, the PLC 416b may be communicatively coupled to the computing device 416a as well as to the flow control element 410 (which comprises, in this embodiment, a proportional valve) and to the sonication generator 412.

Figure 5:
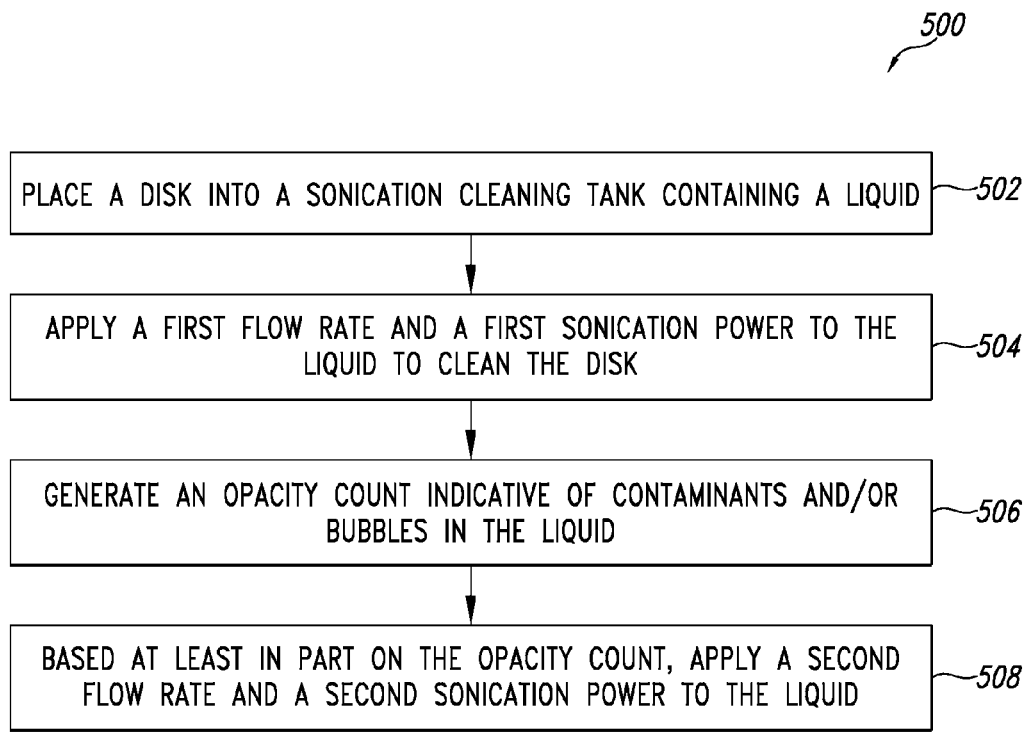
FIG. 5 illustrates a flow chart for manufacturing disks, according to one embodiment.

FIG. 5 illustrates a flow chart for a method 500 of manufacturing disks, according to one illustrated embodiment. This method 500 will be discussed in the context of the sonication cleaning system 100 of FIG. 1. However, the acts disclosed herein may be executed using any sonication cleaning system (including any of the systems illustrated in FIGS. 2-4), in accordance with the described method. Although described in the context of manufacturing, the acts of method 500 may also be carried out during an engineering/testing process independent of a disk manufacturing process. Moreover, the acts of method 500 may also be used during manufacturing/cleaning processes associated with workpieces other than disks.

As described herein, many of the acts comprising the method 500 may be orchestrated by the controller 116, and, in particular, by a processor according to an automatic manufacturing algorithm, based at least in part on computer-readable instructions stored in computer-readable memory and executable by the processor. Of course, a manual implementation of one or more acts of the method 500 may also be employed.

At act 502, a disk 108 is placed into a sonication cleaning tank 102 containing a liquid 104. The disk 108 may be placed into the sonication cleaning tank 102 in a variety of ways. In one embodiment, a disk holder 106 is moved between raised and lowered positions in order to lower the disk 108 into the liquid 104. The entire disk 108 may be submerged, as illustrated, or, in other embodiments, only a portion of the disk 108 may be submerged.

At act 504, a first flow rate and a first sonication power are applied to the liquid 104 to clean the disk 108. As illustrated in FIG. 1, the first flow rate may comprise a cross flow rate, although in other embodiments the first flow rate may comprise a flow rate in an overflow tank. As described above, the first flow rate and the first sonication power may be applied based upon commands sent by the controller 116. However, in other embodiments, one of these variables may be fixed or controlled by some other mechanism. Indeed, in one embodiment, one of these variables may be equal to zero (e.g., there may be no cross flow or sonication generated during part of a cleaning operation).

Figure 7:
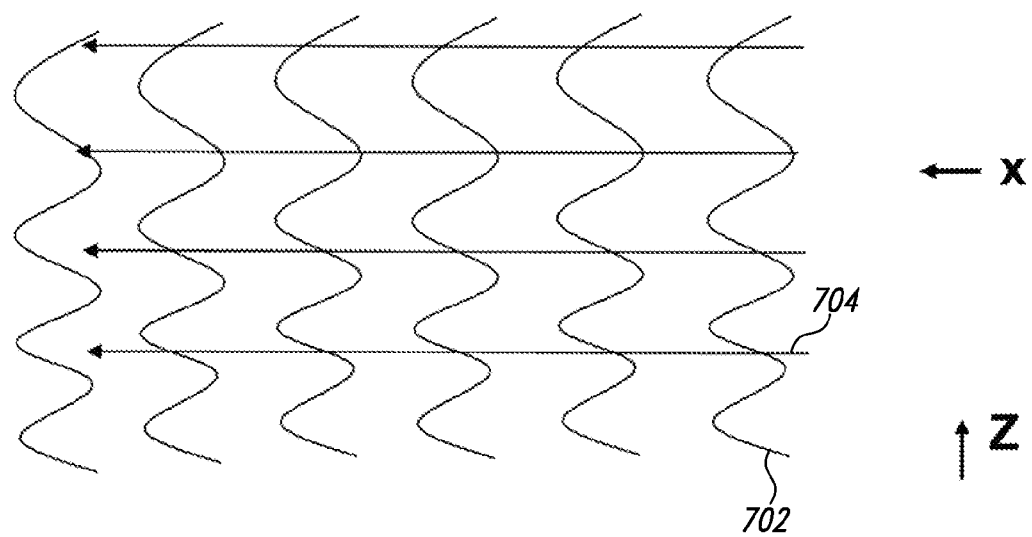
FIG. 7 is a schematic illustration showing a balance between acoustic waves and a laminar cross flow, according to one embodiment.
Figure 8B:
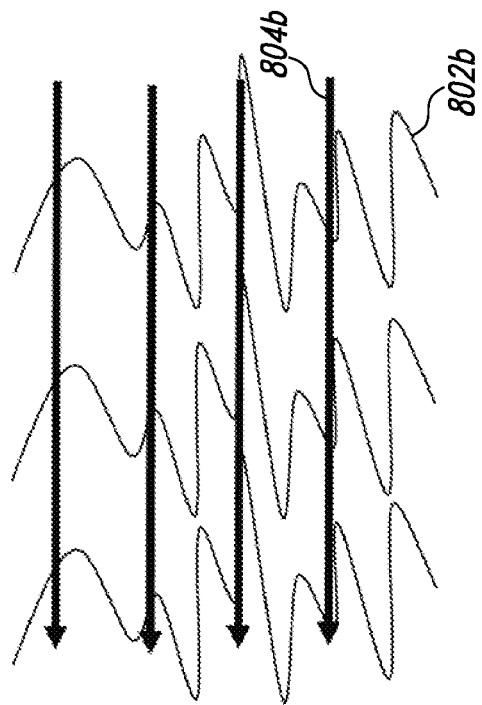
FIG. 8B is a schematic illustration showing a laminar cross flow overwhelming acoustic waves, according to one embodiment.
Figure 8A:
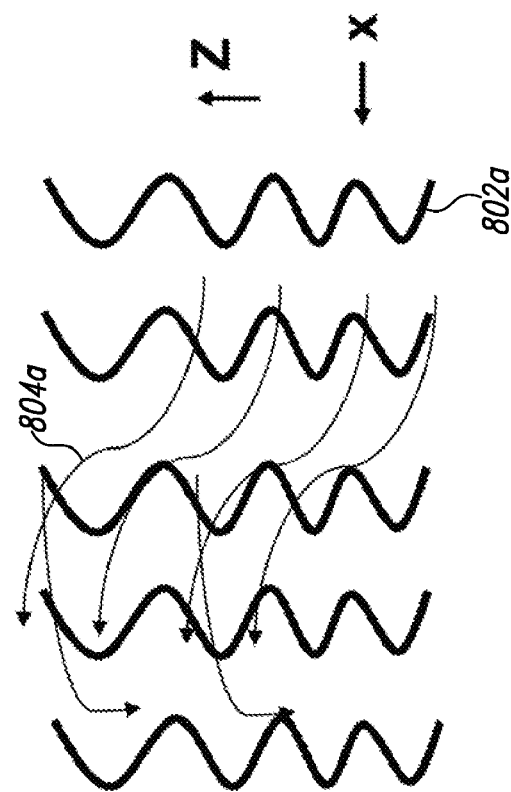
FIG. 8A is a schematic illustration showing acoustic waves overwhelming a cross flow, according to one embodiment.

In some embodiments, it may be desirable to keep the flow rate and the sonication power relatively "balanced" in order to minimize turbulence within the sonication cleaning tank 102. Referring to FIG. 7, for example, a relative balance is shown between the acoustic waves 702 and the laminar cross flow 704. In contrast, FIGS. 8A and 8B schematically show turbulence, which may be undesirable. In FIG. 8A, the acoustic waves 802a overwhelm the laminar cross flow 804a. In such an environment, there may be increased redeposition of contaminants removed from the disk 108. In FIG. 8B, the laminar cross flow 804b overwhelms the acoustic waves 802b. In such an environment, there may be relatively poor particle removal, as the sonication cleaning efficiency is degraded. In each case, there may be increased turbulence due to the imbalance. It may therefore be desirable to keep the flow rate and the sonication power within some balanced range of values.

Figure 9:
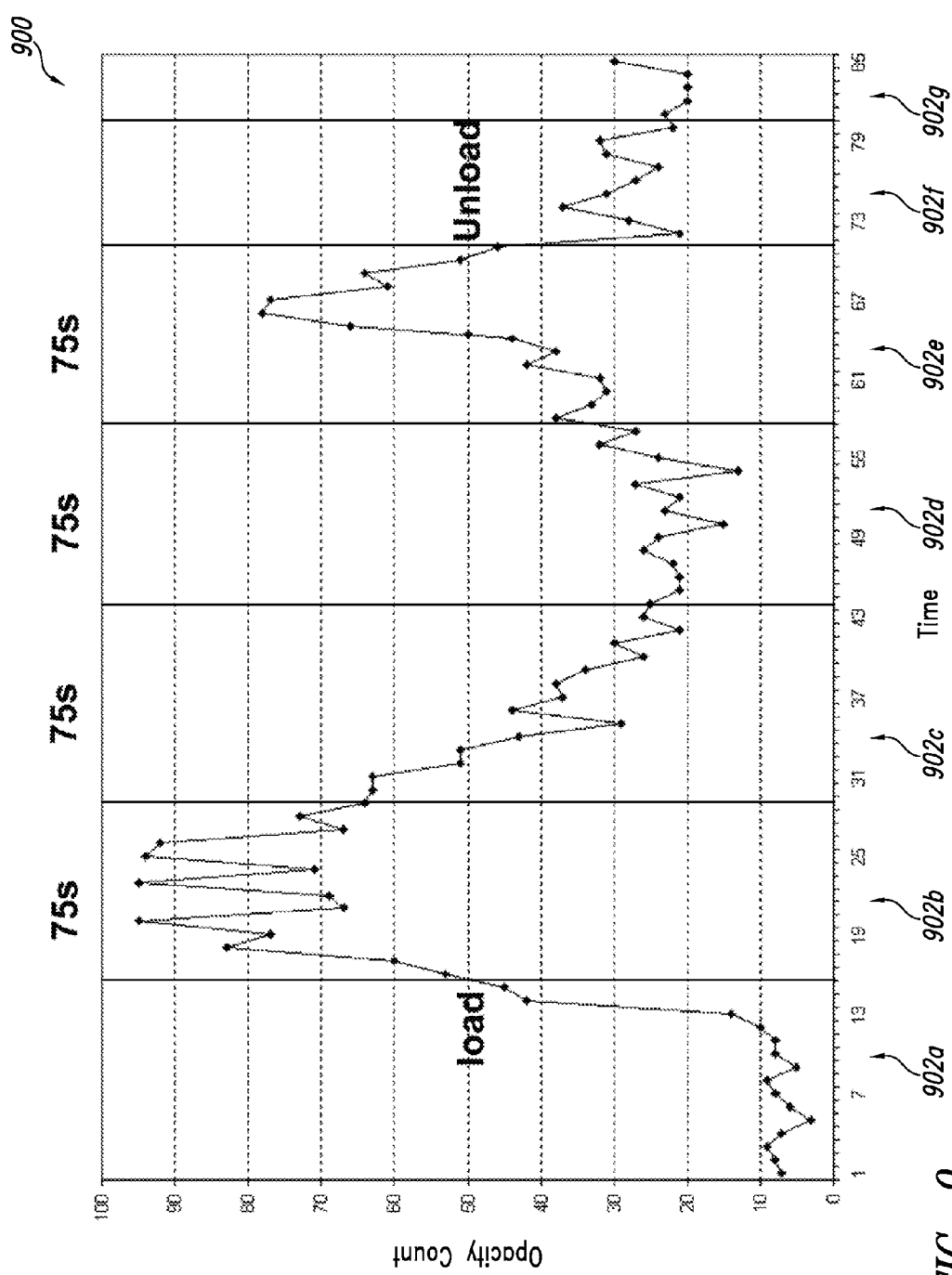
FIG. 9 is a graph illustrating a series of opacity counts generated during an example sonication cleaning operation, according to one embodiment.

A number of different settings for the flow rate and the sonication power may be used in order to clean the disk 108. In some embodiments, a relatively constant flow rate and sonication power may be applied to the sonication cleaning tank 102 during a cleaning operation. In other embodiments, the flow rates and sonication powers may be varied according to some algorithm during a more complex cleaning operation. One example of such a cleaning operation is illustrated in FIG. 9. In graph 900, the x-axis represents time (with each unit equal to about 6 seconds), and the y-axis represents opacity count. The example cleaning operation illustrated in graph 900 is broken into seven phases 902a-g (collectively 902). During the first phase 902a, a cross flow is applied to the sonication cleaning tank 102, but no disk is in the liquid 104. At the start of the second phase 902b, the disk 108 is lowered in, and both sonication and cross flow are applied to the sonication cleaning tank 102. As may be seen by the rise in the opacity count, the sonication and cross flow remove a large number of contaminants from the disk 108 in this second phase 902b. In one embodiment, the disk holder 106 may also be oscillated within the sonication cleaning tank 102 during this second phase 902b. During the third phase 902c, the sonication is turned off, but the cross flow and oscillation of the disk holder 106 continue. During the fourth phase 902d, a cross flow is applied without sonication or oscillation. During the fifth phase 902e, sonication, cross flow and oscillation are used. The settings for this fifth phase 902e may be the same as different from the settings for the second phase 902b. During the sixth phase 902f, the disk 108 is unloaded from the sonication cleaning tank 102, and the sonication cleaning system 100 is readied for the next disk during the seventh phase 902g.

The settings for the cross flow rate, the sonication power and the oscillation frequency of the disk holder 106 may be varied at any of these phases 902. For example, seven different cross flow rates may be used during the seven different phases 902 into which the cleaning operation is broken up. Similarly, there may be seven different sonication power settings applied during the seven phases 902. In some embodiments, the control algorithms for applying these settings may also change according to the phase 902 of the cleaning operation. The first flow rate and the first sonication power referred to in act 504 may correspond to any of the flow rates and sonication powers applied during a cleaning operation.

At act 506, an opacity count indicative of contaminants and/or bubbles in the liquid 104 is generated. As described in greater detail above, in one embodiment, the opacity count is generated by passing at least some of the liquid 104 through a liquid particle counter 114 including a light sensor configured to generate signals indicative of the opacity count. The opacity count may be generated while the cleaning operation is being carried out.

At act 508, based at least in part on the opacity count, a second flow rate and a second sonication power are applied to the liquid 104. In one embodiment, the first flow rate may be equal to the second flow rate. In another embodiment, the first sonication power may be equal to the second sonication power.

The second flow rate and the second sonication power may be applied to the liquid 104 during the same cleaning operation referred to in act 504, during a subsequent cleaning operation for another disk 108, or during an intermediate time period in which no cleaning is taking place. For example, if a cleaning operation calls for a constant flow rate and a constant sonication power, one of these variables may be adjusted (as described in greater detail below) part of the way through a cleaning operation, or they may be adjusted upon beginning the next cleaning operation. On the other hand, if the cleaning operation is defined by multiple phases 902 as illustrated in FIG. 9, the cleaning operation may include a number of settings for different flow rates and sonication powers corresponding to different phases 902. These different settings for the various phases 902 may then be adjusted based at least in part on the opacity count generated during a previous (or even the same) phase 902. For example, the fifth phase 902e may have a default setting of 200 watts for the sonication power, but a different sonication power may be applied during the fifth phase 902e based at least in part on the opacity count. For example, if a previous opacity count is high, the sonication power applied during the fifth phase 902e may be 199 watts.

In one embodiment, a baseline bubble count for the sonication cleaning tank 102 is determined before act 508. The baseline bubble count is an opacity count corresponding primarily to bubbles. In some embodiments, the sonication cleaning tank 102 may be associated with multiple baseline bubble counts corresponding to different configurations. For example, different baseline bubble counts may be associated with different settings for the sonication power and flow rate.

A calibration method may be executed to determine one or more baseline bubble counts. In one embodiment, the sonication cleaning tank 102 may be kept substantially contaminant-free, while different sonication powers and flow rates are applied in order to generate opacity counts corresponding primarily to bubbles. These opacity counts may then be stored by the controller 116 as baseline bubble counts associated with corresponding sonication powers and flow rates. In other embodiments, other methods for determining baseline bubble counts may be employed.

The baseline bubble count may then be subtracted from the opacity count generated at act 506 in order to approximate a contaminant count. That is, in one embodiment, the opacity count generated at act 506 is indicative of both contaminants and bubbles in the liquid 104. By subtracting a baseline bubble count from the opacity count, the contaminant count may more accurately reflect the contribution of contaminants to the opacity count. The second flow rate and the second sonication power may then be applied based at least in part on this contaminant count. For example, if the contaminant count is relatively high, the second flow rate may be set higher than typical in order to "flush" the contaminants out of the sonication cleaning system 100.

In one embodiment, a range of acceptable flow rate values and a range of acceptable sonication power values may be defined. The range of acceptable flow rate values may correspond to a nominal flow rate (e.g., 60 liters per minute in one embodiment) plus or minus 15 liters per minute, while the range of acceptable sonication power values may correspond to a nominal sonication power (e.g., 200 watts in one embodiment) plus or minus ten watts. In other embodiments, larger or smaller ranges may be defined.

The ranges of flow rate values and sonication power values may be defined such that the flow rate remains "balanced"

with the sonication power as illustrated in FIG. 7. In one embodiment, the sonication cleaning tank 102 may be characterized (in a manner similar to that described in greater detail below with reference to FIG. 6) in order to define acceptable flow rate values and acceptable sonication power values based upon observed turbulence. In other embodiments, the range of acceptable flow rate values and the range of acceptable sonication power values may simply be defined by a user. The range of acceptable flow rate values and the range of acceptable sonication power values may be stored in the controller 116 in one or more computer-readable memories. The second flow rate may then be selected from the range of acceptable flow rate values, and the second sonication power may be selected from the range of acceptable sonication power values.

In some embodiments, the range of acceptable flow rate values and the range of acceptable sonication power values may correspond to a particular phase in a cleaning operation. Indeed, different ranges of these values may be associated with different phases 902. Referring to FIG. 9, the range of acceptable sonication power values for the second phase 902b may be 190 to 200 watts, but the range of acceptable sonication power values for the third phase 902c may be zero watts. Thus, the ranges of acceptable values might be time-varying.

In one embodiment, after applying the second flow rate and the second sonication power to the liquid 104, a second opacity count indicative of contaminants and/or bubbles in the liquid 104 may be generated. The same liquid particle counter 114 used to generate the opacity count at act 506 may also generate the second opacity count. In one embodiment, the second opacity count may be generated while the second flow rate and the second sonication power are applied. However, in other embodiments, the second opacity count may be generated at some later point.

Figure 10:
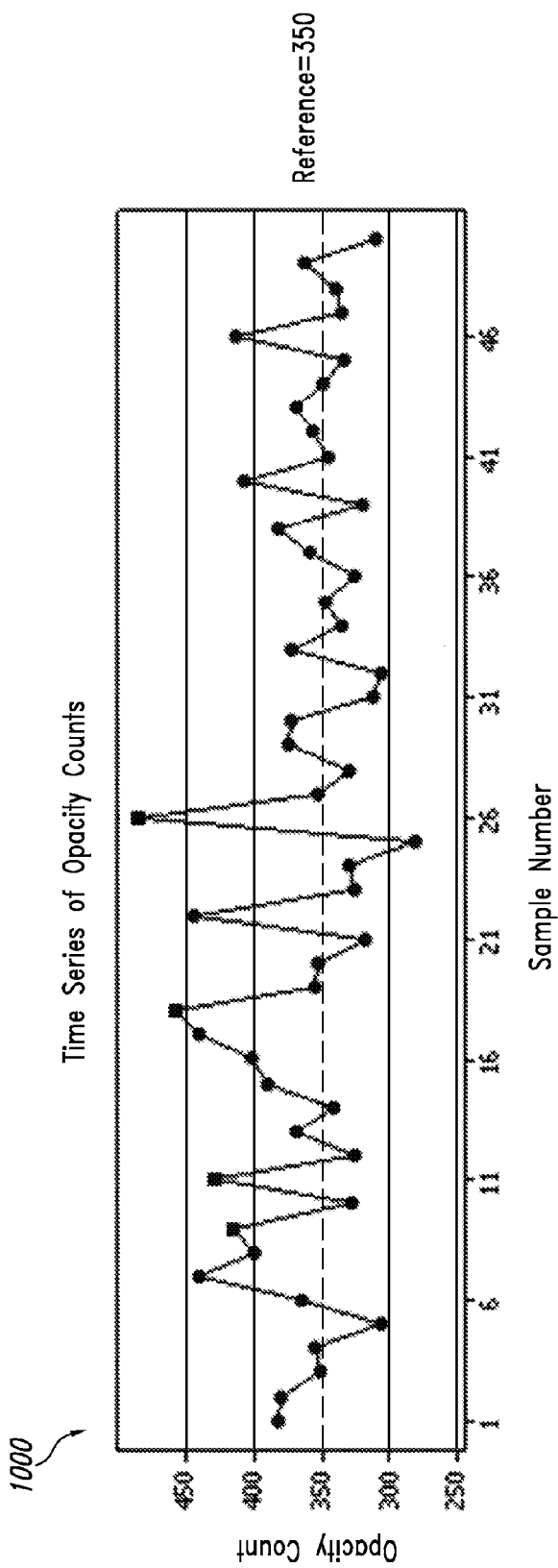
FIG. 10 is a graph illustrating variation about an opacity count reference value during an example cleaning operation, according to one embodiment.

An alarm may then be triggered if the second opacity count is indicative of abnormal variation. A number of algorithms may be used to determine whether or not the second opacity count is indicative of abnormal variation. FIG. 10 is a chart 1000 showing a time series of opacity counts, as they vary about an opacity count reference value of 350. In one embodiment, the opacity count reference value may be preset by a user. In another embodiment, the opacity count reference value may be an average of two or more opacity counts. An alarm may be triggered if the second opacity count is more than three standard deviations above the opacity count reference value. Thus, a standard deviation of two or more of the opacity counts may first be determined, and then the second opacity count may be compared with the opacity count reference value. In another embodiment, an alarm is triggered if the second opacity count and at least one other opacity count of a continuous set of three opacity counts are more than two standard deviations above the opacity count reference value. In still another embodiment, an alarm may be triggered if the second opacity count and at least two other opacity counts of a continuous set of four opacity counts are more than one standard deviation above the opacity count reference value. In other embodiments, other formulae may be used to determine if the second opacity count is indicative of abnormal variation.

The alarm may trigger a number of actions. In one embodiment, the alarm may cease any cleaning operations of the sonication cleaning system 100, and an operator may be alerted. The operator may receive both the alarm as well as a display of the aberrant opacity counts that triggered the alarm. In another embodiment, the alarm may cause a dramatic increase in flow rate or a dramatic decrease in sonication power in order to "flush" the sonication cleaning system 100 of contaminants. In still another embodiment, the alarm may cause the controller 116 to diagnose one or more faulty components of the sonication cleaning system 100.

In some embodiments, a plurality of opacity counts indicative of contaminants and/or bubbles in the liquid 104 may be generated, the plurality of opacity counts including the opacity count. For example, as illustrated in FIG. 10, the liquid particle counter 114 may generate opacity counts substantially continuously at some frequency. In one embodiment, the liquid particle counter 114 may generate an opacity count at least once every ten seconds in order to provide relatively simultaneous feedback during a cleaning operation. In another embodiment, the liquid particle counter 114 may generate an opacity count at least once every six seconds. In still another embodiment, the liquid particle counter 114 may generate an opacity count at least once every second.

An average of the plurality of opacity counts may then be determined. The average may represent, for example, a mean, a median or a mode of the plurality of opacity counts. The average of the plurality of opacity counts may then be compared against an opacity count threshold. The opacity count threshold may represent an upper limit of a range of "normal" opacity count values. In one embodiment, the opacity count threshold may be preset by a user. In another embodiment, the opacity count threshold may be generated by the controller 116. The first flow rate may also be compared against a flow upper limit. The flow upper limit may represent, for example, an upper limit of a range of acceptable flow rate values.

If the average of the opacity counts is higher than the opacity count threshold and the first flow rate has not exceeded the flow upper limit, then the second flow rate may be greater than the first flow rate, and the second sonication power may be substantially equal to the first sonication power. That is, since the average of the opacity counts is relatively high, the flow rate might be increased in order to more quickly remove contaminants from the liquid 104. In one embodiment, the flow rate may be increased by relatively small increments. For example, the second flow rate may be one liter per minute faster than the first flow rate. In other embodiments, larger increments may be used. The flow rate may continue to be increased as long as the average of the opacity counts remains high, and as long as the flow rate has not exceeded the flow upper limit.

If the average of the opacity counts is higher than the opacity count threshold and the first flow rate meets or exceeds the flow upper limit, then the second flow rate may be substantially equal to the first flow rate, and the second sonication power may be lower than the first sonication power. Once the flow rate has met the flow upper limit, the sonication power may be reduced in order to prevent still more contaminants from entering the liquid 104. In one embodiment, the sonication power may be increased by relatively small increments (e.g., by one watt increments), although larger increments may also be used. The sonication power may also continue to be decreased as long as the average of the opacity counts remains high, and as long as the sonication power has not reached a sonication lower limit.

In one embodiment, if the sonication power has reached a sonication lower limit and the flow rate has reached the flow upper limit, then if the average of the opacity counts is higher than the opacity count threshold, an alarm may be triggered, and the cleaning operation may be halted.

The flow rate and the sonication power may be varied in a number of ways. In one embodiment, as illustrated in FIG. 4, information indicative of the opacity count may be received at the computing device 416a, and, based at least in part on the opacity count, a command may be sent from the computing device 416a to a programmable logic controller 416b coupled to a proportional valve 410 to open or close the proportional valve 410 to apply the second flow rate. Similarly, the computing device 416a may send a command to a PLC 416b coupled to a sonication generator 412 to increase or decrease a power applied by the sonication generator 412 to apply the second sonication power. In one embodiment, a single PLC 416b may be coupled to both the proportional valve 410 and to the sonication generator 412. In other embodiments, separate PLCs may be used.

In yet another embodiment, it may be determined that the opacity count is indicative of an increase in turbulence in the liquid 104, and the second flow rate and the second sonication power may be applied based at least in part on the determination. For example, in one embodiment, it may be determined that certain variations in a plurality of opacity counts are most likely due to an increase in turbulence, and such variations may cause the controller 116 to modify the flow rate and/or the sonication power to prevent such increased turbulence.

Figure 6:
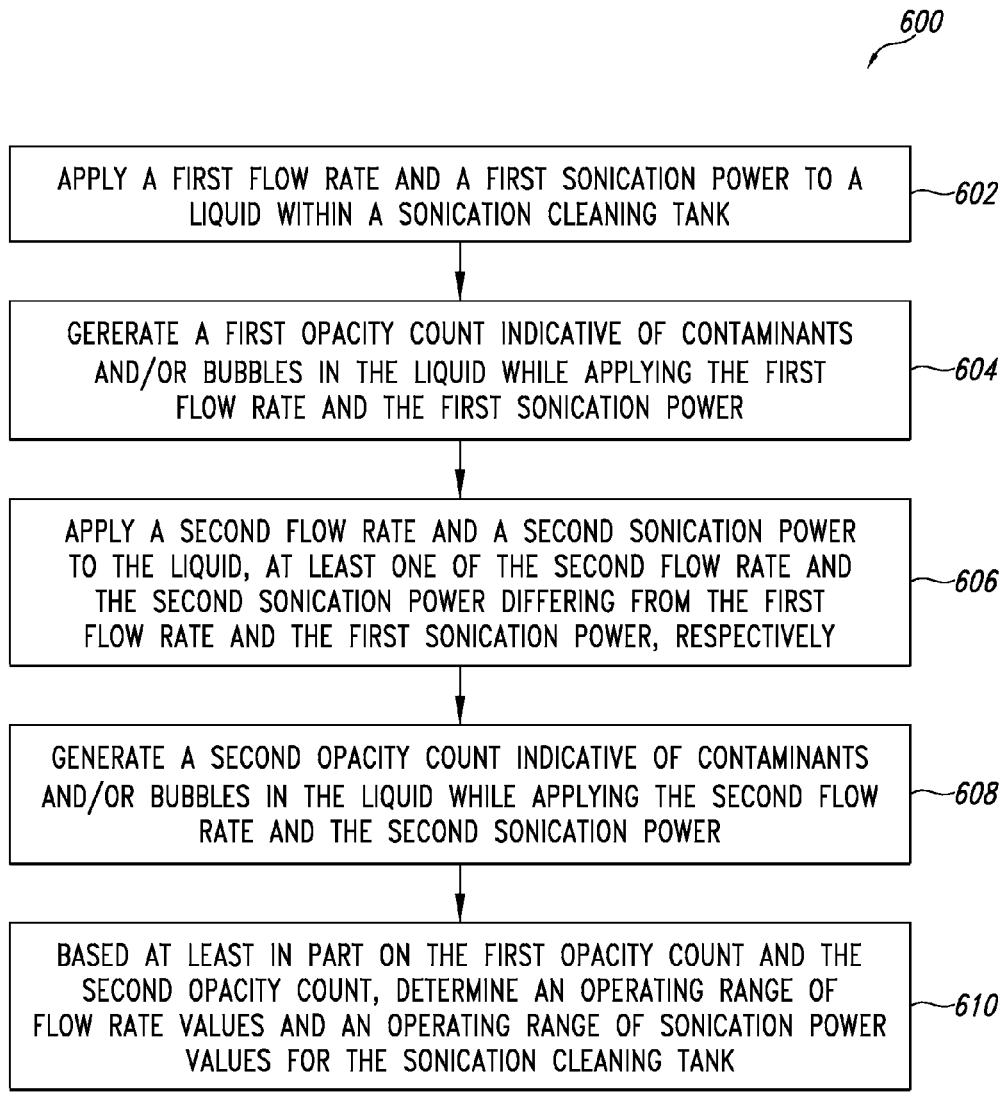
FIG. 6 illustrates a flow chart for characterizing a sonication cleaning tank, according to one embodiment.

FIG. 6 illustrates a flow chart for a method 600 of characterizing a sonication cleaning tank, according to one illustrated embodiment. This method 600 will be discussed in the context of the sonication cleaning system 300 of FIG. 3. However, the acts disclosed herein may be executed using any sonication cleaning system (including any of the configurations illustrated in FIG. 1, 2 or 4), in accordance with the described method.

As described herein, many of the acts comprising the method 600 may be orchestrated by the controller 316, and, in particular, by a processor according to an automatic characterization algorithm, based at least in part on computer-readable instructions stored in computer-readable memory and executable by the processor. Of course, a manual implementation of one or more acts of the method 600 may also be employed.

At act 602, a first flow rate and a first sonication power are applied to a liquid 304 within a sonication cleaning tank 302. In one embodiment, as illustrated in FIG. 3, the first flow rate and the first sonication power may be applied without any disks located in the sonication cleaning tank 302. Indeed, all of the acts of method 600 may be performed without disks in the sonication cleaning tank 302. In another embodiment, one or more disks (or other workpieces) may be positioned within the sonication cleaning tank 302 during the method 600. In still another embodiment, the disk holder 306, without any disks coupled thereto, may be positioned within the sonication cleaning tank 302 during the method 600.

At act 604, a first opacity count indicative of contaminants and/or bubbles in the liquid 304 is generated while applying the first flow rate and the first sonication power. As described in greater detail above, in one embodiment, the opacity count is generated by passing at least some of the liquid 304 through a liquid particle counter 314 including a light sensor configured to generate signals indicative of the first opacity count. In other embodiments, other devices for generating the first opacity count may be used.

At act 606, a second flow rate and a second sonication power are applied to the liquid 304, at least one of the second flow rate and the second sonication power differing from the first flow rate and the first sonication power, respectively. In one embodiment, at least one of the second flow rate and the second sonication power may be selected based at least in part on the first opacity count. In another embodiment, however, the flow rate and the sonication power may simply be varied automatically in order to cover a test range of flow rates and sonication powers.

In one embodiment, both the second flow rate and the second sonication power may differ from the first flow rate and the first sonication power. However, in another embodiment, only one of the second flow rate or the second sonication power may differ, while the other value is maintained substantially constant.

At act 608, a second opacity count indicative of contaminants and/or bubbles in the liquid is generated while applying the second flow rate and the second sonication power. The second opacity count may be generated in a manner substantially similar to that employed at act 604.

At act 610, based at least in part on the first and second opacity counts, an operating range of flow rate values and an operating range of sonication power values are determined for the sonication cleaning tank 304. In one embodiment, the operating ranges may be determined in order to correspond to areas of reduced turbulence. In another embodiment, a plurality of operating ranges may be determined, each corresponding to a different phase of a cleaning operation (as described at length above).

Figure 11A:
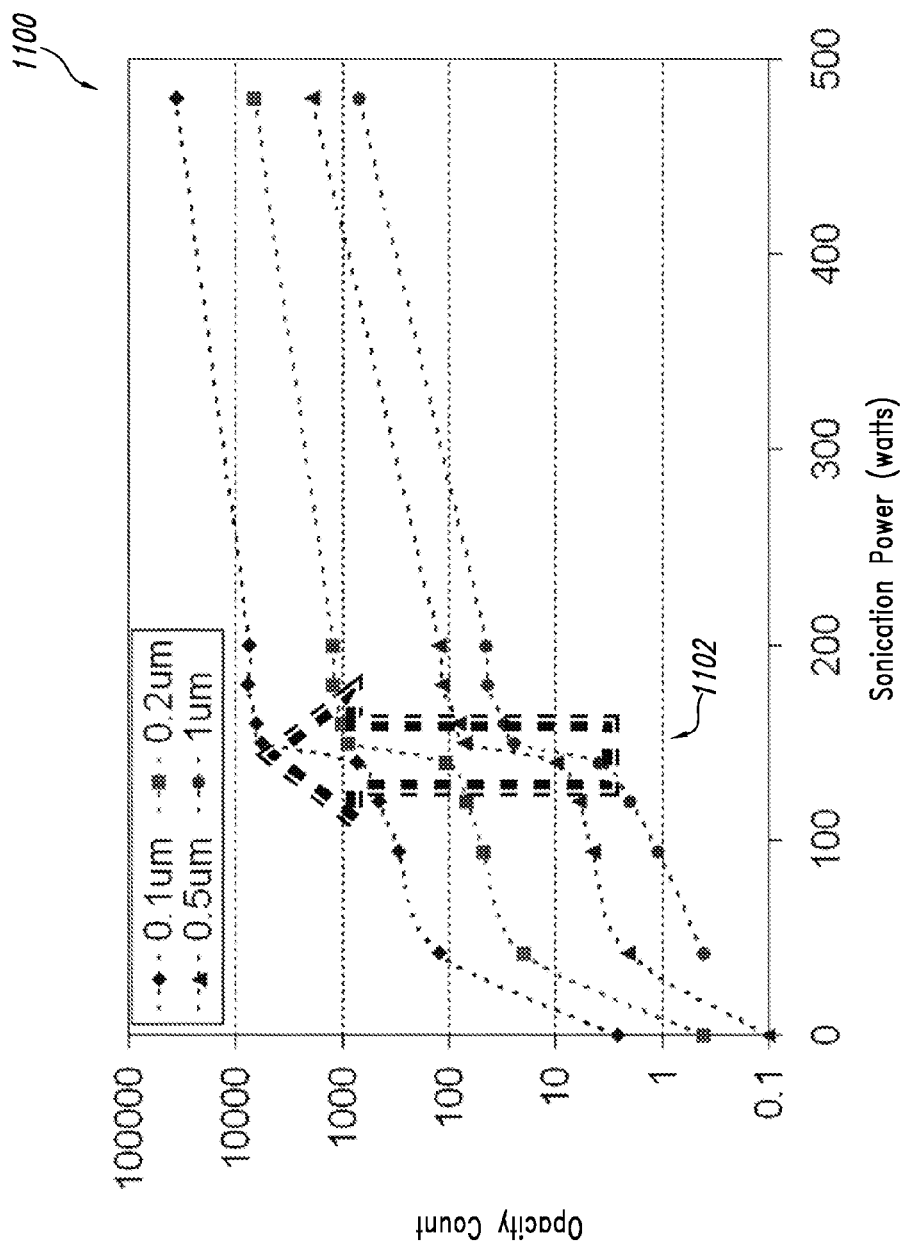
FIG. 11A is a graph illustrating a first order jump in opacity count as sonication power increases, according to one embodiment.

An example series of opacity counts is illustrated in the graph 1100 of FIG. 11A. In this graph 1100, the sonication power is varied while holding the flow rate constant. The different lines in the graph 1100 correspond to differently sized particles detected by a plurality of liquid particle counters. Of course, in some embodiments, only one liquid particle counter may be used to detect contaminants in a defined range of sizes. A first order jump in the opacity counts is highlighted by the arrow 1102. It is hypothesized that this first order jump corresponds to a marked increase in turbulence (corresponding to the situation depicted in FIG. 8A). In one embodiment, an operating range of sonication power values may be selected to be below that first order jump.

Figure 11B:
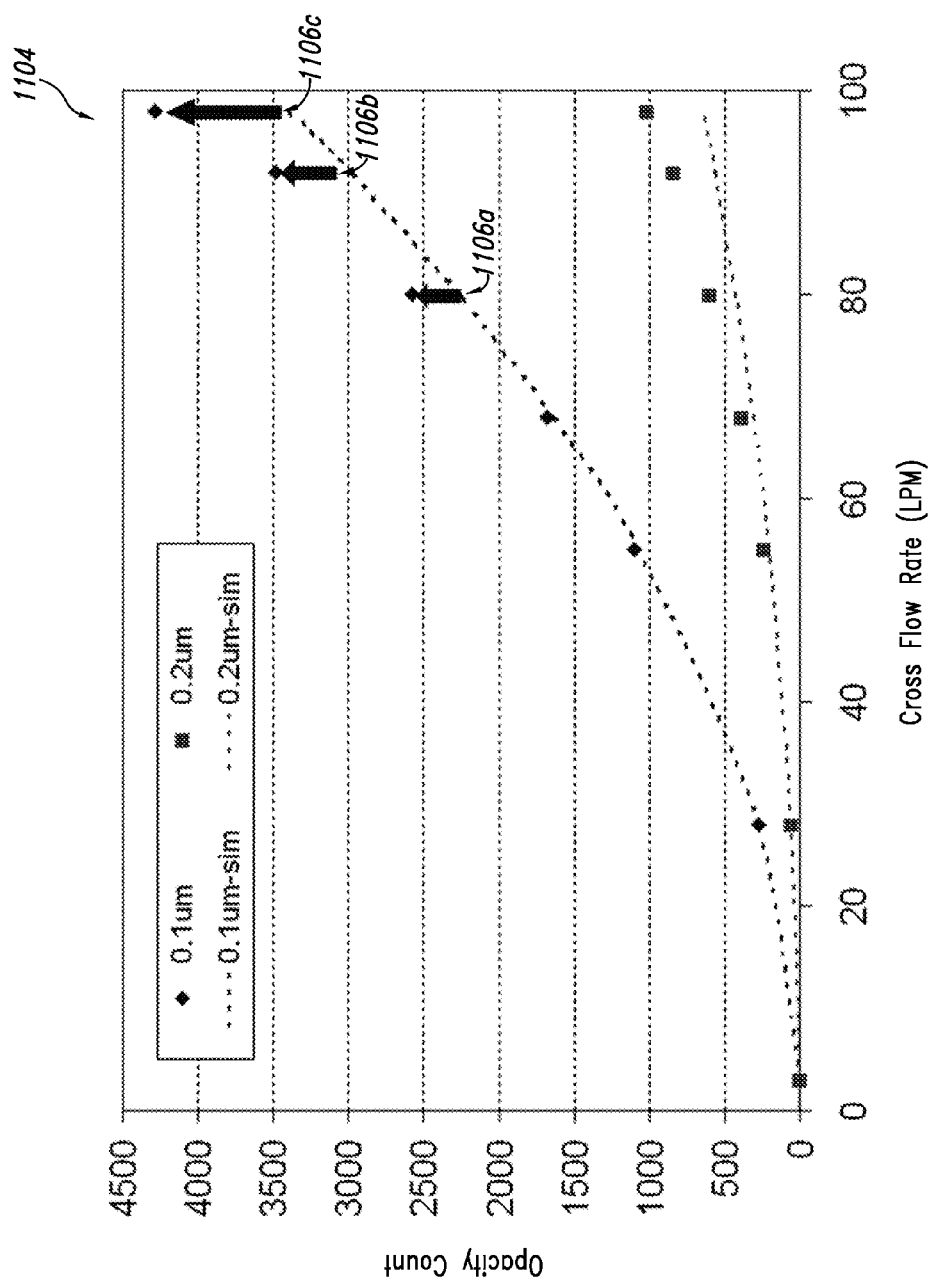
FIG. 11B is a graph illustrating a deviation in measured opacity counts from a predicted square fit as cross flow rate increases, according to one embodiment.

Another example series of opacity counts is illustrated in the graph 1104 of FIG. 11B. In this graph 1104, the cross flow rate is varied while holding the sonication power constant. The two different lines in the graph 1104 correspond to differently sized particles detected by two different liquid particle counters. Of course, in some embodiments, only one liquid particle counter may be used to detect contaminants in a defined range of sizes. The opacity counts vary roughly with a square of the cross flow rate, as illustrated by the dashed lines. However, towards the higher cross flow rates, the opacity counts begin to diverge from this square fit, as illustrated by the arrows 1106a-c in the graph 1104. It is hypothesized that this variation from the square fit corresponds to a marked increase in turbulence (corresponding to the situation depicted in FIG. 8B). Thus, in one embodiment, an operating range of flow rate values may be selected to be within the region in which the opacity counts generally match the square fit.

In one embodiment, a plurality of opacity counts associated with a corresponding plurality of flow rates and sonication powers (as illustrated in FIGS. 11A and 11B) may be generated. The plurality of opacity counts may be stored and subsequently analyzed to determine the operating range of flow rate values and the operating range of sonication power values. For example, the controller 316 may execute an algorithm in order to identify characteristics of increased turbulence in order to define appropriate operating ranges.

In one embodiment, the operating range of flow rate values is selected to be between 40 and 80 liters per minute, and the operating range of sonication power values between 120 and 200 watts. Of course, in other embodiments, other operating ranges may be selected based upon the particular characteristics of different sonication cleaning systems. For example, the operating ranges for both the flow rate and the sonication power might be increased beyond 80 liters per minute and 200 watts, respectively.

The foregoing detailed description has set forth various embodiments of the systems and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, the embodiments disclosed herein, in whole or in part, can be equivalently implemented in standard integrated circuits, as one or more programs executed by one or more processors, as one or more programs executed by one or more controllers (e.g., microcontrollers), as firmware, or as virtually any combination thereof.

We claim:

1. A sonication cleaning system comprising:
 a sonication cleaning tank configured to contain a liquid;
 a disk holder configured to hold a disk within the liquid during a cleaning operation;
 a flow control element coupled to the sonication cleaning tank and configured to cause the liquid to flow through the sonication cleaning tank;
 a sonication generator configured to generate sonication through the liquid within the sonication cleaning tank;
 a liquid particle counter, the liquid particle counter configured to generate an opacity count indicative of contaminants and/or bubbles in the liquid; and
 a controller communicatively coupled to the liquid particle counter configured to:
  determine whether the opacity count is indicative of an increase in turbulence in the liquid; and
  control at least one of the flow control element and the sonication generator based at least in part on the opacity count and the turbulence determination.

2. The sonication cleaning system of claim 1, wherein the disk holder is movable between a raised position wherein the disk is positioned above the liquid and a lowered position wherein the disk is positioned within the liquid.

3. The sonication cleaning system of claim 1, wherein the liquid particle counter includes a light sensor configured to generate signals indicative of the opacity count.

4. The sonication cleaning system of claim 3, wherein the liquid particle counter is fluidly coupled to the sonication cleaning tank and is configured to generate the opacity count during the cleaning operation.

5. The sonication cleaning system of claim 1, wherein the controller further comprises a computing device communicatively coupled to the liquid particle counter, and a programmable logic controller communicatively coupled to and controlled by the computing device and further coupled to the flow control element and the sonication generator.

6. The sonication cleaning system of claim 5, wherein the computing device includes:
 a processor operable to execute instructions; and
 a computer-readable memory having instructions stored thereon that are executable by the processor in order to cause the processor to:
  select from among a range of acceptable flow rate values and a range of acceptable sonication power values to control the flow control element and sonication generator.

7. The sonication cleaning system of claim 6, wherein the computer-readable memory has further instructions stored thereon that are executable by the processor in order to cause the processor to trigger an alarm if the opacity count is indicative of abnormal variation.

8. The sonication cleaning system of claim 6, wherein the computer-readable memory has further instructions stored thereon that are executable by the processor in order to cause the processor to:
 determine a baseline bubble count for the sonication cleaning tank; and
 subtract the baseline bubble count from the opacity count to approximate a contaminant count.

9. The sonication cleaning system of claim 8, wherein the computer-readable memory has further instructions stored thereon that are executable by the processor in order to cause the processor to control the at least one of the flow control element and the sonication generator based at least in part on the contaminant count.

10. A sonication cleaning system comprising:
 a sonication cleaning tank configured to contain a liquid;
 a disk holder configured to hold a disk within the liquid during a cleaning operation;
 a flow control element coupled to the sonication cleaning tank and configured to cause the liquid to flow through the sonication cleaning tank;
 a sonication generator configured to generate sonication through the liquid within the sonication cleaning tank;
 a liquid particle counter, the liquid particle counter configured to generate a plurality of opacity counts indicative of contaminants and/or bubbles in the liquid; and
 a controller communicatively coupled to the liquid particle counter and configured to:
  control at least one of the flow control element and the sonication generator based at least in part on one or more of the plurality of opacity counts;
  determine an average of the plurality of opacity counts;
  compare the average of the plurality of opacity counts against an opacity count threshold;
  compare a first flow rate against a flow upper limit; and
  if the average of the plurality of opacity counts is higher than the opacity count threshold and the first flow rate has not exceeded the flow upper limit, raise the first flow rate to a second flow rate while maintaining a substantially constant sonication power.

11. The sonication cleaning system of claim 10, wherein the controller is further configured to:
 if the average of the plurality of opacity counts is higher than the opacity count threshold and the first flow rate meets or exceeds the flow upper limit, lower a first sonication power to a second sonication power while maintaining the first flow rate substantially constant.

12. The sonication cleaning system of claim 1, wherein the flow control element includes a proportional valve.

13. A sonication cleaning system comprising:
 a sonication cleaning tank configured to contain a liquid;
 a flow control element coupled to the sonication cleaning tank and configured to cause the liquid to flow through the sonication cleaning tank;
 a sonication generator configured to generate sonication through the liquid within the sonication cleaning tank;
 a liquid particle counter, the liquid particle counter configured to generate opacity counts indicative of contaminants and/or bubbles in the liquid; and a controller communicatively coupled to the liquid particle counter and configured to control the flow control element and the sonication generator, the controller further configured to:
- cause the flow control element to apply a first flow rate and cause the sonication generator to apply a first sonication power to the liquid;
- receive a first opacity count from the liquid particle counter while the first flow rate and the first sonication power are applied to the liquid;
- cause the flow control element to apply a second flow rate and cause the sonication generator to apply a second sonication power to the liquid, at least one of the second flow rate and the second sonication power differing from the first flow rate and the first sonication power, respectively;
- receive a second opacity count from the liquid particle counter while the second flow rate and the second sonication power are applied to the liquid; and
- based at least in part on the first opacity count and the second opacity count, determine an operating range of flow rate values and an operating range of sonication power values for the sonication cleaning tank.

14. The sonication cleaning system of claim 13, wherein determining the operating ranges includes determining flow rates and sonication powers corresponding to reduced turbulence.

15. The sonication cleaning system of claim 13, wherein the liquid particle counter includes a light sensor configured to generate signals indicative of the opacity count.

16. The sonication cleaning system of claim 15, wherein the liquid particle counter is fluidly coupled near an egress port of the sonication cleaning tank.

17. The sonication cleaning system of claim 13, wherein the controller further comprises a processor and a programmable logic controller communicatively coupled to and controlled by the processor and further coupled to the flow control element and the sonication generator.

18. The sonication cleaning system of claim 17, wherein the flow control element comprises a proportional valve, and causing the flow control element to apply a first flow rate and causing the sonication generator to apply a first sonication power includes sending a command from the processor to the programmable logic controller coupled to the proportional valve to open or close the proportional valve to apply the first flow rate.

19. The sonication cleaning system of claim 17, wherein causing the flow control element to apply the first flow rate and causing the sonication generator to apply the first sonication power includes sending a command from the processor to the programmable logic controller coupled to the sonication generator to increase or decrease a power applied by the sonication generator to thereby apply the first sonication power.

20. The sonication cleaning system of claim 13, wherein the controller is further configured to:
- receive a plurality of opacity counts associated with a corresponding plurality of flow rates and sonication powers;
- store the plurality of opacity counts; and
- analyze the plurality of opacity counts to determine the operating range of flow rate values and the operating range of sonication power values.

21. The sonication cleaning system of claim 13, wherein the operating range of flow rate values is between 40 and 80 liters per minute.

22. The sonication cleaning system of claim 13, wherein the operating range of sonication power values is between 120 and 200 watts.

* * * * *